US012223701B2

(12) United States Patent
Coimbra De Andrade et al.

(10) Patent No.: US 12,223,701 B2
(45) Date of Patent: Feb. 11, 2025

(54) SYSTEMS AND METHODS FOR TRAINING EVENT PREDICTION MODELS FOR CAMERA-BASED WARNING SYSTEMS

(71) Applicant: Verizon Patent and Licensing Inc., Basking Ridge, NJ (US)

(72) Inventors: Douglas Coimbra De Andrade, Florence (IT); Aurel Pjetri, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 416 days.

(21) Appl. No.: 17/651,590

(22) Filed: Feb. 18, 2022

(65) Prior Publication Data

US 2023/0267718 A1 Aug. 24, 2023

(51) Int. Cl.
*G06V 10/82* (2022.01)
*G06N 3/045* (2023.01)
*G06N 3/047* (2023.01)
*G06V 20/40* (2022.01)

(52) U.S. Cl.
CPC ............ *G06V 10/82* (2022.01); *G06N 3/045* (2023.01); *G06N 3/047* (2023.01); *G06V 20/44* (2022.01)

(58) Field of Classification Search
None
See application file for complete search history.

(56) References Cited

U.S. PATENT DOCUMENTS

| | | | |
|---|---|---|---|
| 2019/0050711 A1* | 2/2019 | Yao | B60W 40/00 |
| 2020/0134424 A1* | 4/2020 | Chen | G06N 3/084 |
| 2020/0250837 A1* | 8/2020 | Fagg | G06F 18/253 |
| 2021/0182654 A1* | 6/2021 | Markram | G06N 3/047 |
| 2021/0201507 A1* | 7/2021 | Fagg | G06V 20/58 |
| 2022/0343152 A1* | 10/2022 | Dai | G06N 3/047 |

FOREIGN PATENT DOCUMENTS

CN 112004033 A * 11/2020 ........... G06N 3/0454

OTHER PUBLICATIONS

Feichtenhofer et al., "SlowFast Networks for Video Recognition," 2019, 10 pages.
Bertinetto et al., "Fully-Convolutional Siamese Networks for Object Tracking," Department of Engineering Science, University of Oxford, 2016, 16 pages.

* cited by examiner

*Primary Examiner* — Jiangeng Sun

(57) ABSTRACT

In some implementations, a device may receive image data and sensor data associated with the image data. The image data may depict a series of scenes that are captured over a time period and that are associated with an occurrence of an event. The device may determine a time of interest, within the time period, at which a value of the sensor data satisfies one or more criteria. The device may extract a portion of the image data based on the time of interest. The device may extract, from the portion of the image data, a slice of image data depicting a first set of scenes and a slice of image data depicting a second set of scenes. The device may train, based on the slices of image data, a model to predict a probability of an occurrence of an event.

20 Claims, 11 Drawing Sheets

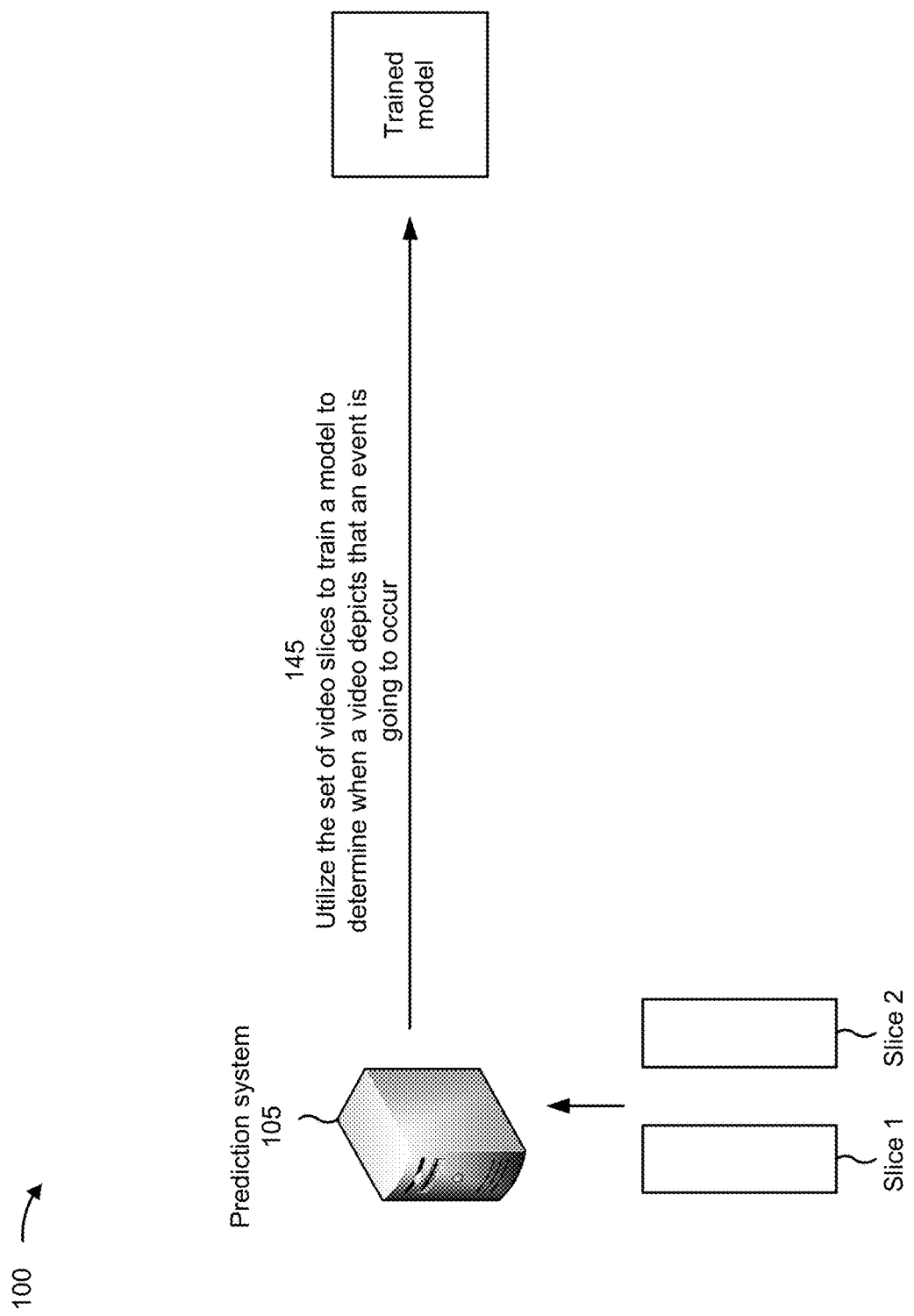

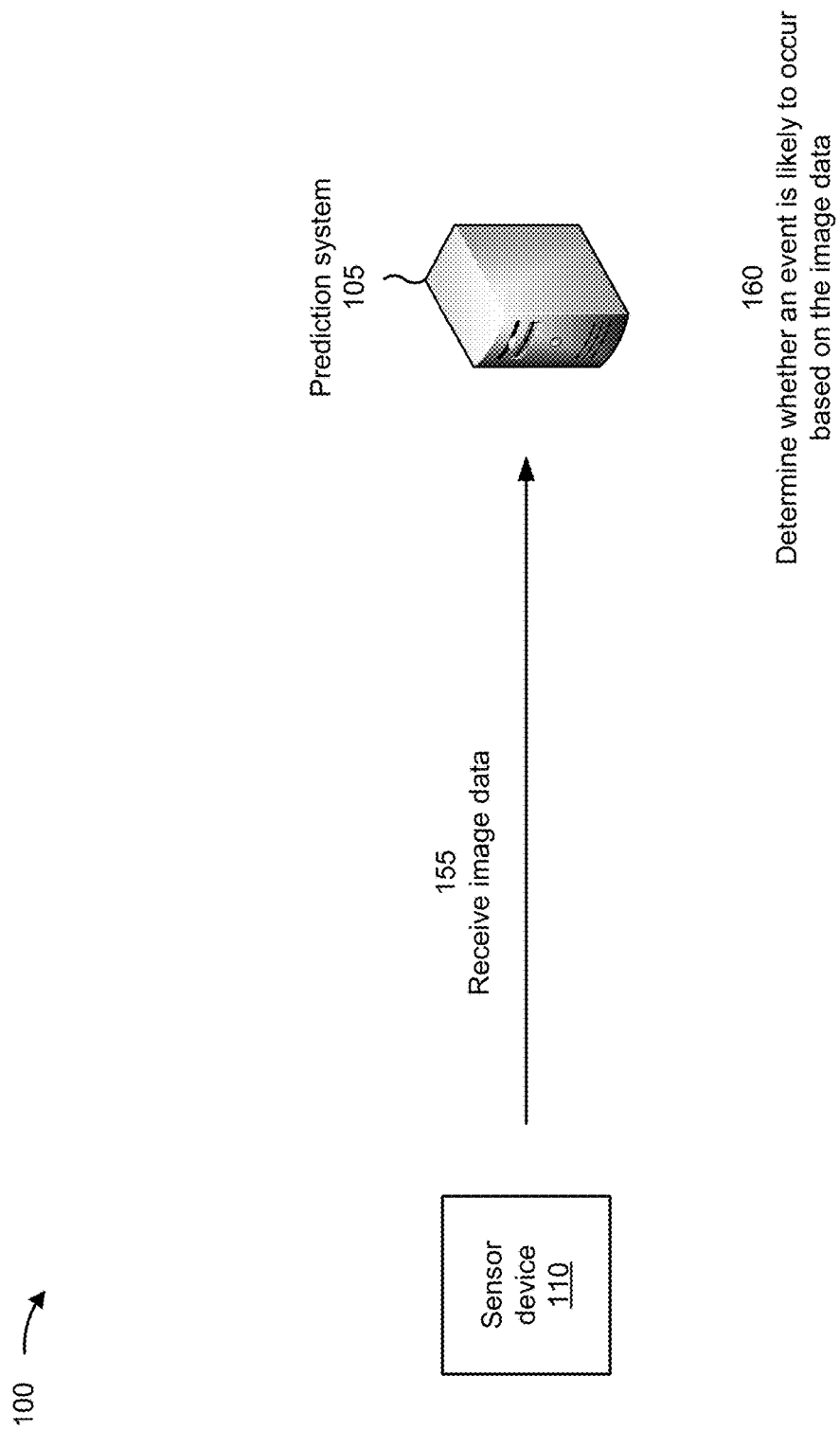

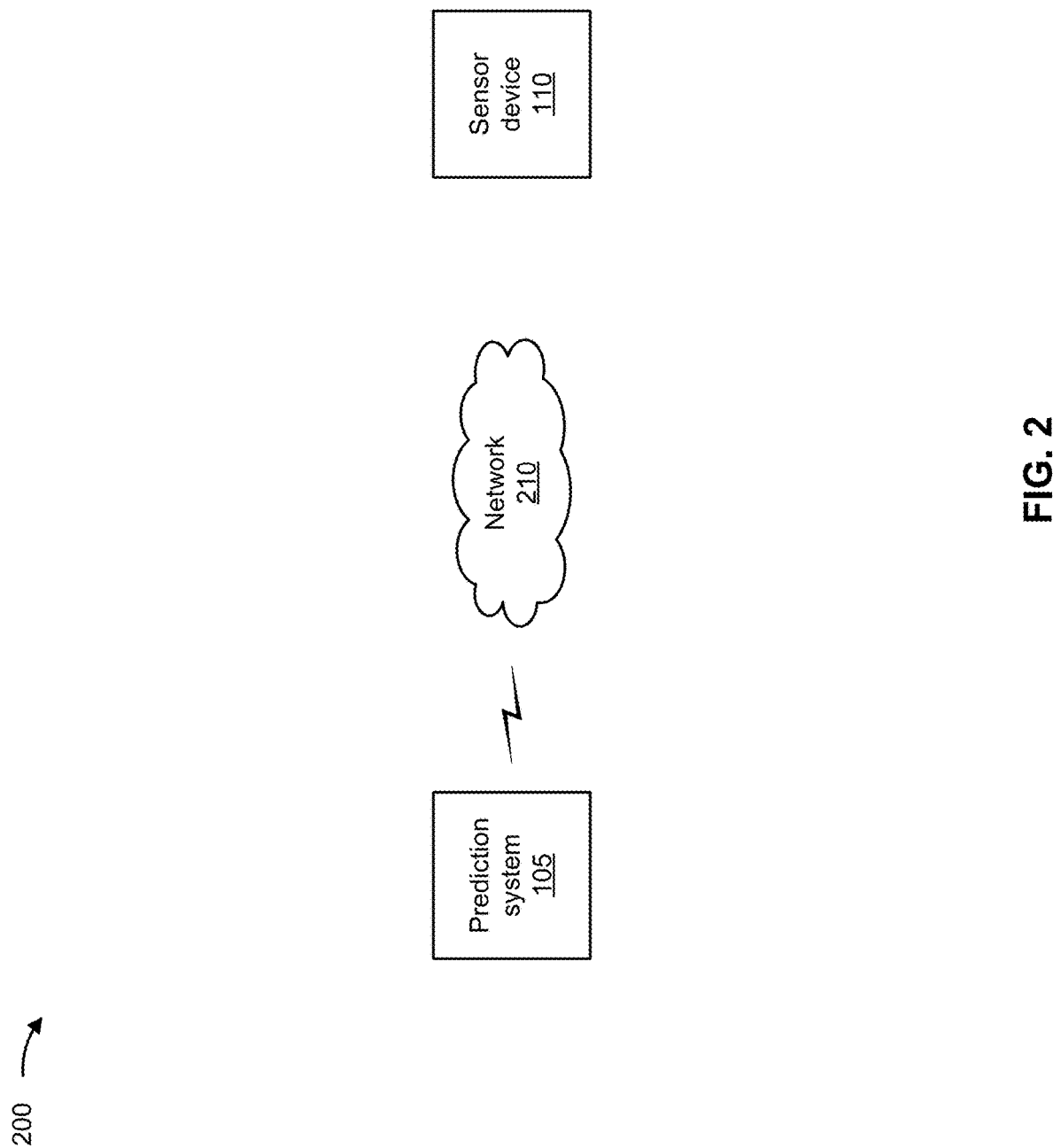

SYSTEMS AND METHODS FOR TRAINING EVENT PREDICTION MODELS FOR CAMERA-BASED WARNING SYSTEMS

BACKGROUND

A camera-based warning system may be equipped with several devices that enable capture of image data, such as still images or video. The camera-based warning system may be configured to analyze the image data to determine that an event has occurred and/or provide a warning regarding the occurrence of the event to a user.

BRIEF DESCRIPTION OF THE DRAWINGS

FIGS. 1A-1H are diagrams of an example associated with training and utilizing event prediction models for camera-based warning systems.

FIG. 2 is a diagram of an example environment in which systems and/or methods described herein may be implemented.

DETAILED DESCRIPTION OF EXAMPLE EMBODIMENTS

Figure 1A:
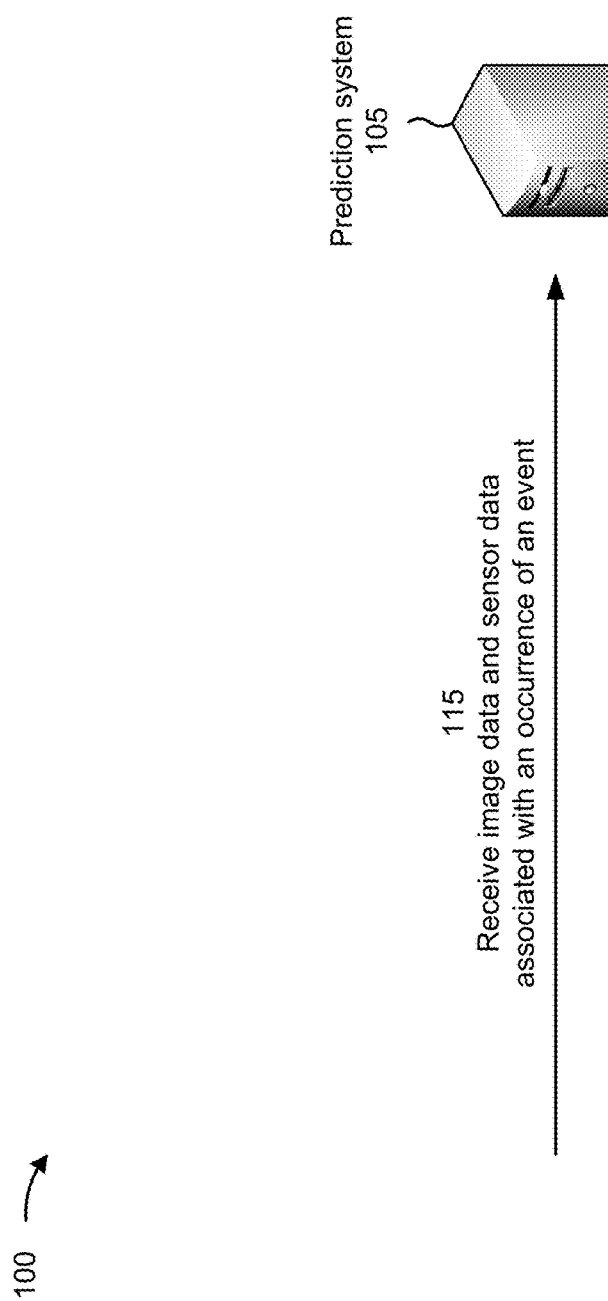

The following detailed description of example implementations refers to the accompanying drawings. The same reference numbers in different drawings may identify the same or similar elements.

A non-camera-based warning system may utilize non-image sensor data as a primary means for detecting an occurrence of an event. For example, a vehicle may include a forward collision warning system that utilizes a forward-looking radar device as the primary sensor for obtaining data used to detect a collision with an object.

A camera-based warning system may utilize image data as a primary means for detecting an occurrence of an event. For example, a vehicle may include a lane departure warning (LDW) system and a forward collision warning system. The LDW system may utilize image data obtained by forward-looking cameras to monitor lane markings and to warn a driver of a lane violation while the forward collision warning system may utilize data obtained by a forward-looking radar device as the primary sensor for detecting a collision.

In some cases, the camera-based warning systems may be designed based on hand-engineered features. The hand-engineered features may include properties of an image that are derived using one or more algorithms and information present in the image. For example, a hand-engineered feature may include an edge of an object in an image that is detected using an edge-detector algorithm. However, the use of hand-engineered features may prohibit a system from learning dangerous situations from examples and may constrain the system to detecting specific situations related to the hand-engineered features. Further, it may not be feasible to hard code all scenarios and interactions that may lead to an occurrence of an event or may prompt the warning system to take an action such as providing a warning to a user or a defensive measure.

In some cases, the warning system may include a machine learning model that is trained to analyze image data to determine the occurrence of the event. However, training the machine learning model may require utilizing hundreds, thousands, or tens of thousands of images and each image must be manually reviewed to determine the type of event depicted in the image and annotated with various features required for training the machine learning model.

Some implementations described herein enable a warning system to train and utilize a model to predict an occurrence of event based on image data. In some implementations, the model may comprise a neural network (such as a Siamese neural network) that utilizes a loss and that enforces predetermined boundary values and monotonicity while still being appropriate for training deep learning models with automatic differentiation frameworks like Tensorflow™ or PyTorch™, among other examples.

In some implementations, to train the model, the warning system may receive image data that includes a plurality of videos and sensor data associated with each of the videos. The videos may each depict images of a scene prior to an occurrence of an event, at the occurrence of the event, and subsequent to the occurrence of the event. For each video, the warning system may utilize the sensor data to identify a time at which the event occurred. The warning system may extract a portion of the video having a start corresponding to a time prior to the occurrence of the event and an end corresponding to the time at which the event occurred.

In some implementations, the warning system may slice the portion of the video to generate a pair of sliced videos. The warning system may provide the pair of sliced videos, as inputs, to the model. For each sliced video, the model may determine a score indicating a likelihood of the occurrence of the event. In some implementations, a loss function utilized to train the model may be based on the assumption that the probability of the occurrence of the event is non-decreasing from the start of the portion of the video corresponding to the time prior to the occurrence of the event through the end of the video corresponding to the time at which the event occurred. In this way, the warning system may avoid the extra labeling effort of manually identifying the exact moment in the video when a user viewing the video would understand that the event is going to occur (e.g., when a probability of an event occurring satisfies a probability threshold).

FIGS. 1A-1H are diagrams of an example 100 associated with training and utilizing event prediction models for camera-based warning systems. As shown in FIGS. 1A-1H, example 100 includes prediction system 105 and a sensor device 110. The prediction system 105 and the sensor device 110 are described in greater detail elsewhere herein.

As shown in FIG. 1A, and by reference number 115, the prediction system 105 may receive image data and sensor data associated with an occurrence of a type of event. In some implementations, the image data may correspond to a plurality of videos. Each video, of the plurality of videos, may be associated with a respective portion of the sensor data. Although, the prediction system 105 is described utilizing image data, the prediction system 105 may utilize any type of sequential data (e.g., audio data, a sequential set of still images, and/or a sequential series of sensor readings, among other examples).

In some implementations, the type of the event may include a vehicular event (e.g., an accident and/or a harsh driving event (e.g., slamming on the brakes or swerving caused by the driver being drowsy, intoxicated, and/or distracted, among other examples) and the sensor data may include vehicle data associated with a vehicle involved in the occurrence of the vehicular event. For example, a video, of the plurality of videos, may be captured by a camera (e.g., a dashcam, a parking camera, and/or a backup camera, among other examples) associated with the vehicle. The video may depict scenes of an environment of the vehicle prior to the occurrence of the vehicular event, during the occurrence of the vehicular event, and/or after the occurrence of the vehicular event.

In some implementations, the portion of the sensor data for a video associated with a vehicular event may include vehicle data indicating one or more operating parameters of the vehicle. For example, the portion of the sensor data may include vehicle data obtained prior to the occurrence of the vehicular event, during the occurrence of the vehicular event, and/or after the occurrence of the vehicular event. In some implementations, the vehicle data may include acceleration data obtained by an accelerometer and indicating an acceleration of the vehicle, rotational velocity data obtained by a gyroscope and indicating a rotational velocity of the vehicle, location data obtained by a global positioning system (GPS) device indicating one or more locations of the vehicle, and/or object data obtained by a radar and/or a LIDAR and indicating a distance and/or a location of objects relative to the vehicle, among other examples.

In some implementations, the vehicle data may include images and/or videos of a driver of a vehicle. For example, the vehicle data may include images and/or videos depicting varying levels of drowsiness, intoxication, and/or distraction of the driver prior to the occurrence of the vehicular event, during the occurrence of the vehicular event, and/or after the occurrence of the vehicular event.

In some implementations, the type of event may include a component failure event and the portion of the sensor data associated with a video depicting the component failure event may include values of one or more operating parameters of the component. For example, the video may depict a component, or a portion of the component (e.g., an outer surface of the component, an inner surface of the component, and/or a stress point, among other examples) prior to the occurrence of the component failure event, during the occurrence of the component failure event, and/or after the occurrence of the component failure event.

The portion of the sensor data associated with the video may include data indicating values of one or more operating parameters of the component prior to the occurrence of the component failure event, during the occurrence of the component failure event, and/or after the occurrence of the component failure event. For example, the portion of the sensor data may include data indicating an internal temperature of the component, an internal pressure associated with the component, an ambient temperature associated with the component, and/or an activity level of the component (e.g., an amount of data received, processed, and/or transmitted, a quantity of items produced, and/or an amount of time the component is in an active state, an idle state, and/or a sleep state), among other examples.

As an example, the component may include a pressure vessel. A video, of the plurality of videos included in the image data, may depict one or more portions of the pressure vessel (e.g., of an outer surface of the pressure vessel, an inner surface of the pressure vessel, or a stress point of the pressure vessel, among other examples) prior to an occurrence of a failure of the pressure vessel, during the occurrence of the failure of the pressure vessel, and/or after the occurrence of the failure of the pressure vessel. The portion of the sensor data associated with the video may include data indicating a pressure associated with the pressure vessel (e.g., an internal pressure of the pressure vessel) and/or a strain at one or more points on the pressure vessel prior to the failure of the pressure vessel, prior to the occurrence of the failure of the pressure vessel, during the occurrence of the failure of the pressure vessel, and/or after the occurrence of the failure of the pressure vessel.

In some implementations, the type of event may include an act performed by a user (e.g., a user accessing a secure area, a user driving a vehicle, a user operating a piece of equipment, or a user committing a criminal act, among other examples). The portion of the sensor data associated with a video depicting an act performed by a user may include data associated with the user performing the act. For example, the portion of the sensor data may include surveillance data that includes images and/or video depicting an area in which the act is performed, audio data, and/or keypad data (e.g., data indicating a series of inputs provided via a keypad and/or another type of user interface), among other examples.

Figure 1B:
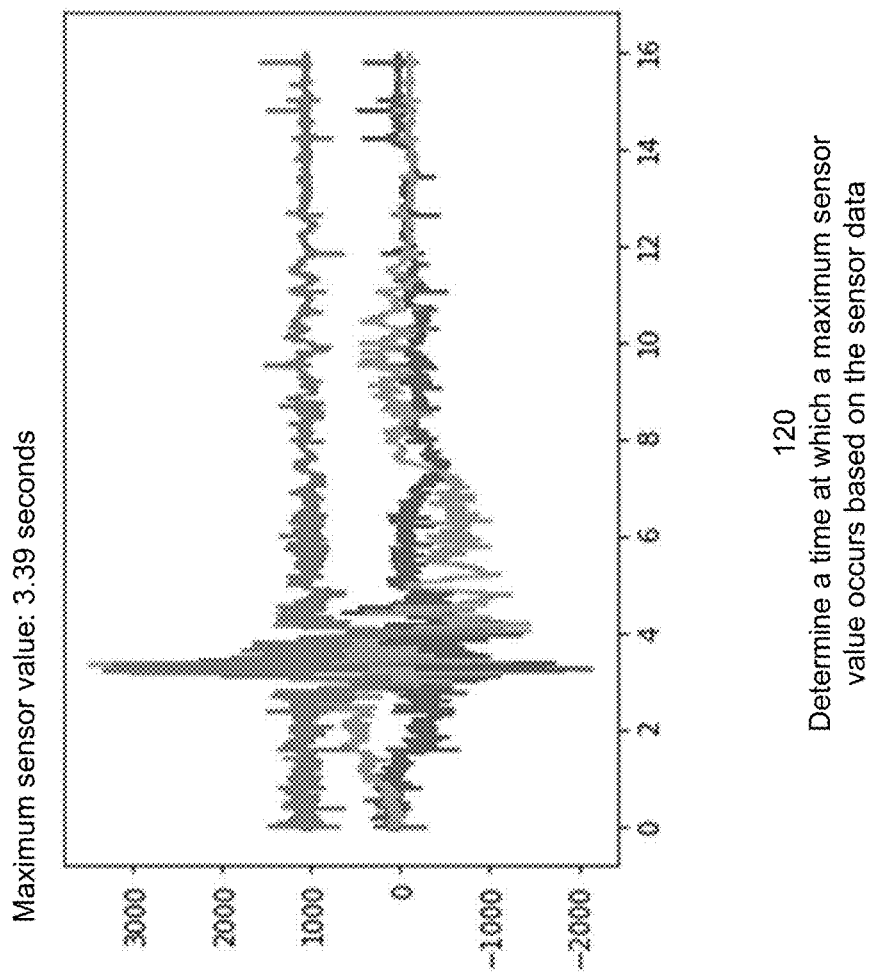

In some implementations, the prediction system 105 may determine a time of interest using sensor data as input. As shown in FIG. 1B, and by reference number 120, the prediction system 105 may determine a time at which a sensor value satisfies one or more criteria based on the sensor data. For example, for a video, of the plurality of videos, the prediction system 105 may identify a portion of the sensor data associated with the video and may determine a maximum sensor value, a minimum sensor value, a maximum absolute sensor value, a minimum absolute sensor value, a maximum slope, a minimum slope, and/or a sensor value that satisfies a threshold value, among other examples, indicated by the identified portion of the sensor data.

In some implementations, the prediction system 105 may determine a maximum absolute sensor value. The maximum absolute sensor value may correspond to a maximum value and/or a minimum value indicated by the identified portion of the sensor data. For example, the sensor data may include acceleration data. The acceleration data may include positive values indicating an acceleration of the vehicle and negative values indicating a deacceleration of the vehicle. Because an occurrence of an event may be indicated by a maximum acceleration of the vehicle and/or a maximum deacceleration of the vehicle, the prediction system 105 may determine the absolute value of each sensor value included in the identified portion of the sensor data and may determine the maximum absolute sensor value based on the absolute value of each sensor value.

In some implementations, the prediction system 105 may determine a time of interest based on the sensor data. In some implementations, the time of interest may correspond to a time at which the maximum sensor value occurs. For example, the portion of the sensor data may include a series of sensor values that are obtained by the sensor device 110 at a sampling rate (e.g., 60 Hz, 100 Hz, or 120 Hz, among other examples). The prediction system 105 may determine the time associated with the maximum sensor value based on the sampling rate and a position of the maximum sensor value within the series of sensor values.

Alternatively, and/or additionally, the series of sensor values may be associated with a series of time stamps and/or other information indicating respective times at which the sensor values included in the series of sensor value were obtained by the sensor device 110. The prediction system 105 may determine the time associated with the maximum sensor value based on the time stamp and/or the other information indicating a time at which the maximum sensor value was obtained by the sensor device 110.

In some implementations, each sensor value included in the series of sensor values includes a plurality of component values. As an example, a portion of the sensor data associated with a video associated with a vehicular event may include a series of acceleration values indicating an acceleration of a vehicle. An acceleration value, of the series of acceleration values, may include a first component value indicating the acceleration of the vehicle along an x-axis corresponding to a direction of travel of the vehicle, a second component value indicating the acceleration of the vehicle along a y-axis perpendicular to the direction of travel of the vehicle, and a third component value indicating the acceleration of the vehicle along a z-axis that is perpendicular to the x-axis and the y-axis.

In some implementations, the prediction system 105 may determine the maximum sensor value based on a maximum of a sum of squares of accelerations in all axes. For example, for each acceleration value, the prediction system 105 may determine a sum of the square of the first component value, the square of the second component value, and the third component value (e.g., $a_x(t)^2 + a_y(t)^2 + a_z(t)^2$). The prediction system 105 may determine the maximum sensor value based on an acceleration value for which a maximum sum of the squares was determined.

As an example, the video may correspond to sixteen seconds of video. The portion of the sensor data may be obtained by an accelerometer at a sampling rate of 100 Hz (e.g., every 0.01 seconds). For a first acceleration value (e.g., an acceleration value obtained at t=0), the portion of sensor data may indicate first acceleration component along the x-axis ($a_x(0)$), a second acceleration component along the y-axis ($a_y(0)$), and a third acceleration component along the z-axis ($a_z(0)$). Similarly, for a second acceleration value (e.g., t=0.01), the portion of the sensor data may indicate a first acceleration component along the x-axis ($a_x(0.01)$), a second acceleration component along the y-axis ($a_y(0.01)$), and a third acceleration component along the z-axis ($a_z(0.01)$). The portion of the sensor data may indicate additional acceleration values in increments corresponding to the sampling rate (e.g., increments of 0.01 seconds) in a similar manner (e.g., additional acceleration values obtained from t=0.02 seconds through t=16 seconds at 0.01 increments). In some implementations, the prediction system 105 may determine a sum of squares of accelerations in all axes for each acceleration value based on the formula: $|a(t)| = a_x(t)^2 + a_y(t)^2 + a_z(t)^2$. The system may determine the time associated with the maximum sensor value (e.g., $t=T_{max}$) based on a time associated with a sensor value for which a maximum of the sum of squares of accelerations in all axes is determined (e.g., $T_{max} = \mathrm{argmax}(|a(t)|)$).

Figure 1C:
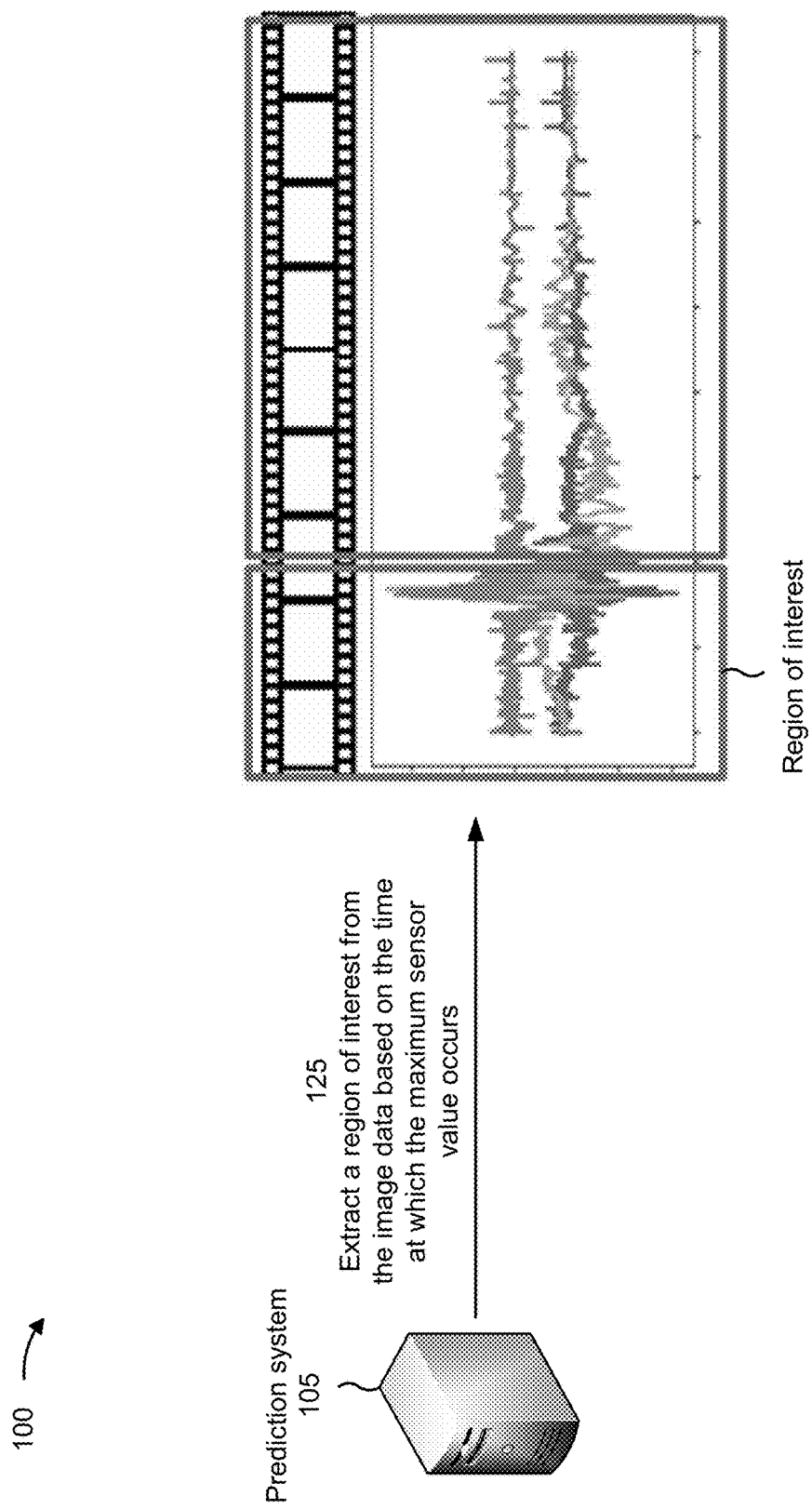

As shown in FIG. 1C, and by reference number 125, the prediction system 105 may extract a portion of the video corresponding to a region of interest from the image data based on the time at which the maximum sensor value occurs. In some implementations, the prediction system 105 may extract the portion of the video from a start frame through an end frame.

In some implementations, the start frame may correspond to a start of the video (e.g., a frame associated with t=0) and the end frame may correspond to the frame of the video that is associated with the time at which the portion of the sensor data indicates the maximum sensor value (e.g., $t=T_{max}$). For example, the video may include a plurality of frames and the prediction system 105 may identify a first frame of the plurality of frames as a start frame for extracting the portion of the video corresponding to the region of interest. The prediction system 105 may identify a frame, of the plurality of frames, associated with a time of interest computed using sensor data as the end frame. For example, the prediction system 105 may identify a frame, of the plurality of frames, associated with the time at which the portion of the sensor data indicates the maximum sensor value as the end frame.

In some implementations, the prediction system 105 may identify the first frame, of the plurality of frames, as the start frame based on the video satisfying one or more criteria. For example, the prediction system 105 may identify the first frame as corresponding to the start frame based on a quantity of frames included in the plurality of frames satisfying (e.g., being less than) a frame threshold (e.g., 500 frames, 1,000 frames, or 1,600 frames, among other examples), a size of the video satisfying a size threshold (e.g., 128 kilobytes (KB), 256 KB, or 512 KB, among other examples), and/or a length of the video satisfying a length threshold (e.g., 10 seconds, 16 seconds, or 24 seconds, among other examples).

In some implementations, the prediction system 105 may identify, as the start frame, a frame, of the plurality of frames, associated with an amount of time (e.g., 5 second, 10 seconds, or 15 seconds, among other examples) prior to the time associated with the maximum sensor value. In some implementations, the amount of time may be configured to enable the start frame to depict a safe condition (e.g., a point at which a user, viewing the video, would not anticipate the occurrence of the event or a frame associated with a score indicating a likelihood of an occurrence of the event that satisfies a score threshold (e.g., less than 5%, 10%, or 25%, among other examples)) while minimizing an amount of time and/or a quantity of frames between the start frame and the end frame.

The prediction system 105 may extract the region of interest from the video based on the start frame and the end frame (e.g., from a frame corresponding to t=0 through a frame corresponding to $t=T_{max}$). The region of interest may include a sequential group of frames, of the plurality of frames. An initial frame, of the sequential group of frames, may correspond to the start frame and a last frame, of the sequential group of frames, may correspond to the end frame.

Figure 1D:
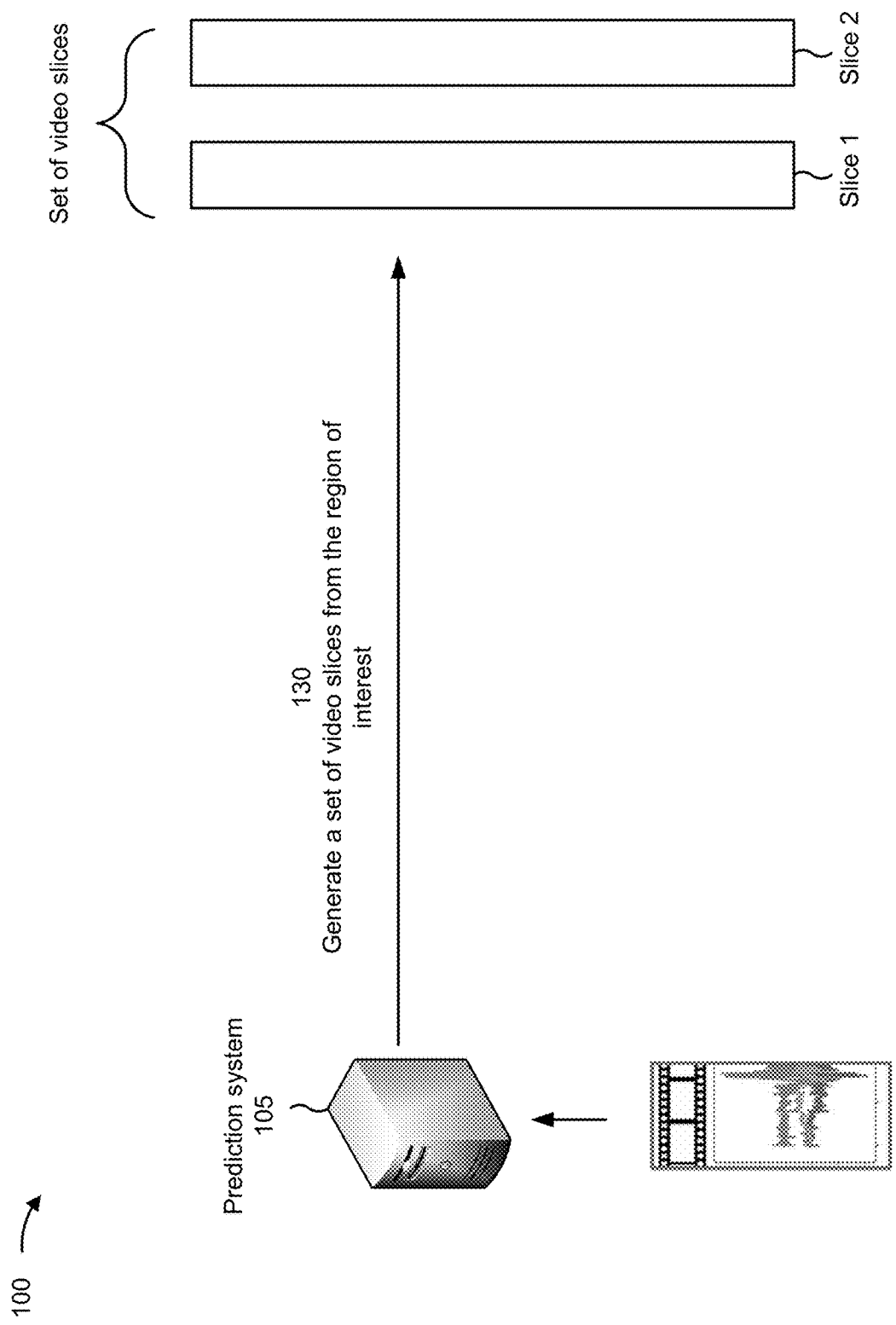

As shown in FIG. 1D, and by reference number 130, the prediction system 105 may generate a set of video slices from the region of interest. In some implementations, as shown in FIG. 1D, the set of video slices may include a first video slice and a second video slice. In some implementations, the prediction system 105 may randomly select the first video slice and the second video slice.

In some implementations, the prediction system 105 may extract the set of video slices based on an amount of time. For example, the prediction system 105 may extract the set of video slices to cause the first video slice and/or the second video slice to correspond to one second of video, two seconds of video, or three seconds of video, among other examples.

In some implementations, the prediction system 105 may extract the set of video slices based on a quantity of frames. For example, the prediction system 105 may extract the set of video slices to cause the first video slice and/or the second video slice to include one frame, 50 frames, 80 frames, 100 frames, or 160 frames, among other examples.

Figure 1E:
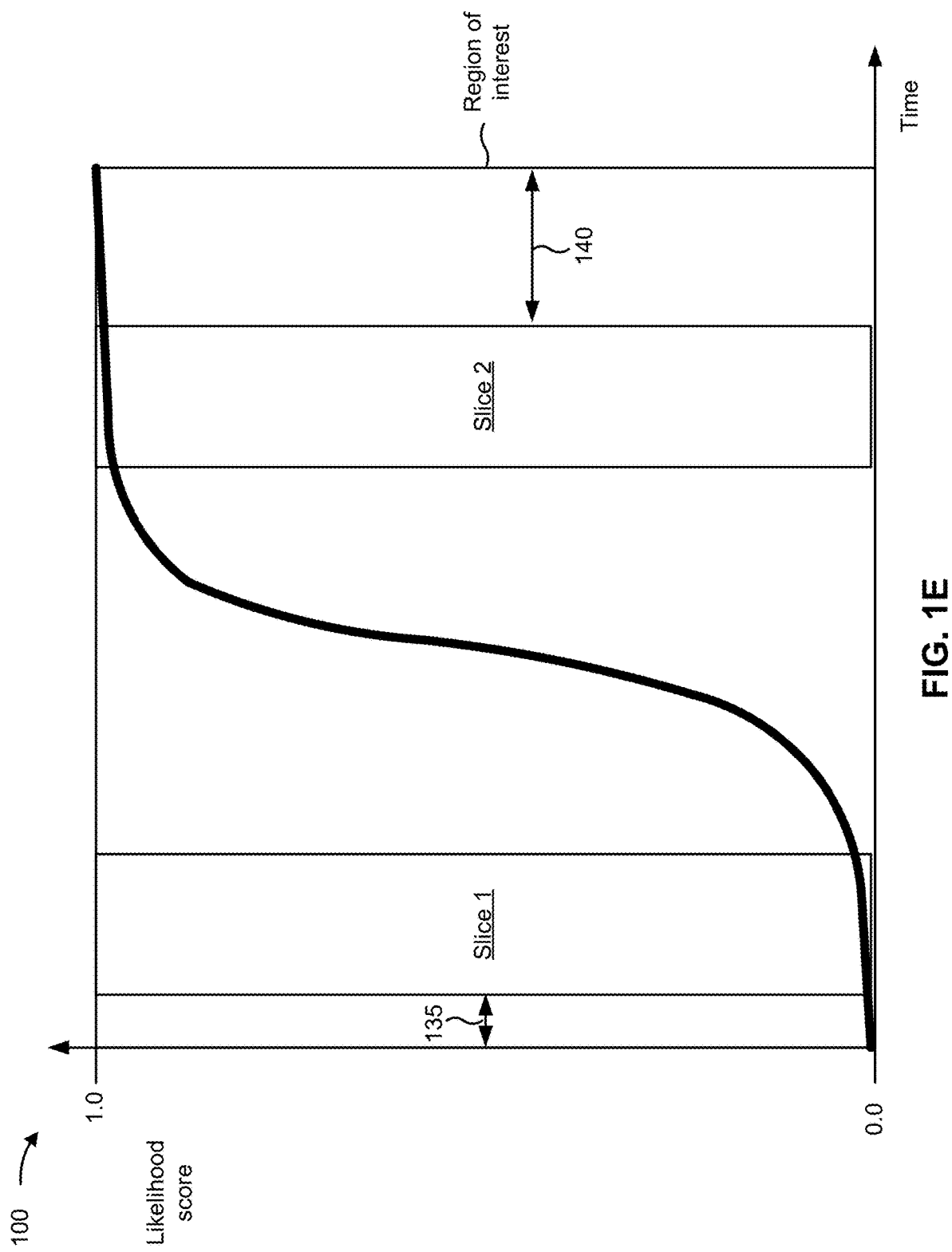

In some implementations, the prediction system 105 may determine a first ground truth associated with the first video slice and a second ground truth associated with the second ground slice based on a position of the first video slice within the region of interest relative to a position of the second video slice. For example, as shown in FIG. 1E, the first video slice may include one or more frames, of the sequential group of frames, that occur prior to one or more frames, of the sequential group of frames, included in the second video slice. As shown by reference number 135, the prediction system 105 may determine a relative distance of the first video slice to the beginning of the region of interest based on the one or more frames of the first video slice occurring before the one or more frames of the second video slice. The prediction system 105 may determine the first ground truth based on the relative distance of the first video slice to the beginning of the region of interest.

As shown by reference number 140, the prediction system 105 may determine a relative distance of the second video slice to the end of the region of interest based on the one or more frames of the second video slice occurring after the one or more frames of the first video slice. The prediction system 105 may determine the second ground truth based on the relative distance of the second video slice to the end of the region of interest.

In some implementations, the first ground truth and/or the second ground truth may not indicate the danger score that the model should predict for the first video slice and/or the second video slice, respectively. Instead, in some implementations, as described in greater detail below, the first ground truth and/or the second ground truth may correspond to information that influences a loss associated with the model determining scores for a set of video slices.

As shown in FIG. 1F, and by reference number 145, the prediction system 105 may utilize the set of video slices to train a model to determine when a video depicts that an event is going to occur. In some implementations, the event is a dangerous event (e.g., a vehicular collision, a harsh driving event, or a criminal act, among other examples). The prediction system 105 may utilize the set of first video slices, the first ground truth, and the second ground truth to train the model to determine a point (e.g., a frame and/or a time associated with a frame) in a video when the video transitions from a safe condition to a dangerous condition (e.g., a point at which a user, viewing the video, would understand that an event is about to occur and/or a frame associated with a score that satisfies a score threshold (e.g., greater than 50%, 75%, or 90%, among other examples))).

In some implementations, the model may include a plurality of neural networks. The plurality of neural networks may be the same and/or may utilize the same set of weights. For example, the model may include a Siamese neural network. The Siamese neural network may include two identical neural networks (e.g., two neural networks having the same configuration and the same weights) that are configured to separately process the first video slice and the second video slice and to compare a result of separately processing the first video slice and the second video slice. In some implementations, the neural networks may process the first video slice and the second video slice concurrently. The neural networks may be configured to process image data to predict a likelihood of an occurrence of an event. For example, the neural networks may include a Slowfast network, a convolutional neural network (CNN), or a recurrent neural network (RNN), among other examples.

Each neural network may process one of the first video slice or the second video slice to predict a score for the processed video slice. The score for a video slice may indicate a likelihood of an occurrence of the type of event based on one or more scenes depicted in the video slice.

As an example, the first video slice may correspond to a first portion of video and the second video slice may correspond to a second portion of the video. The first neural network of the model may process the first video slice to determine a first score for the first video slice and the second neural network of the model may process the second video slice to determine a second score for the second video slice. The first score may indicate a likelihood of an occurrence of the type of event based on a scene depicted in the first video slice and the second score may indicate a likelihood of an occurrence of the type of event based on a scene depicted in the second video slice.

As another example, the region of interest may correspond to a portion of a video that depicts an environment ahead of a vehicle. The beginning of the portion of the video may depict the vehicle traveling safely along a road. The end of the portion of the video may depict an occurrence of a collision with an animal as the animal attempts to run across the road. The first video slice may be extracted from the beginning of the portion of the video and may not depict the presence of the animal. The second video slice may be extracted from the end of the portion of the video and may depict the animal along the side of the road.

The first neural network may process the first video slice and may determine a first score indicating a first likelihood of a collision with an animal. The second neural network may process the second video slice and may determine a second score indicating a second likelihood of a collision with an animal. The first score may indicate a relatively low likelihood of a collision with an animal relative to the second score based on the first video slice not depicting the presence of an animal and the second video slice depicting the animal along the side of the road.

In some implementations, the first score and/or the second score may be within a range from a first value through a second value. The first value (e.g., 0.0 or 0%, among other examples) may indicate a minimum likelihood of the occurrence of the event. The second value (e.g., 1.0, 10.0, or 100%, among other examples) may indicate a maximum likelihood of the occurrence of the event.

Figure 1G:
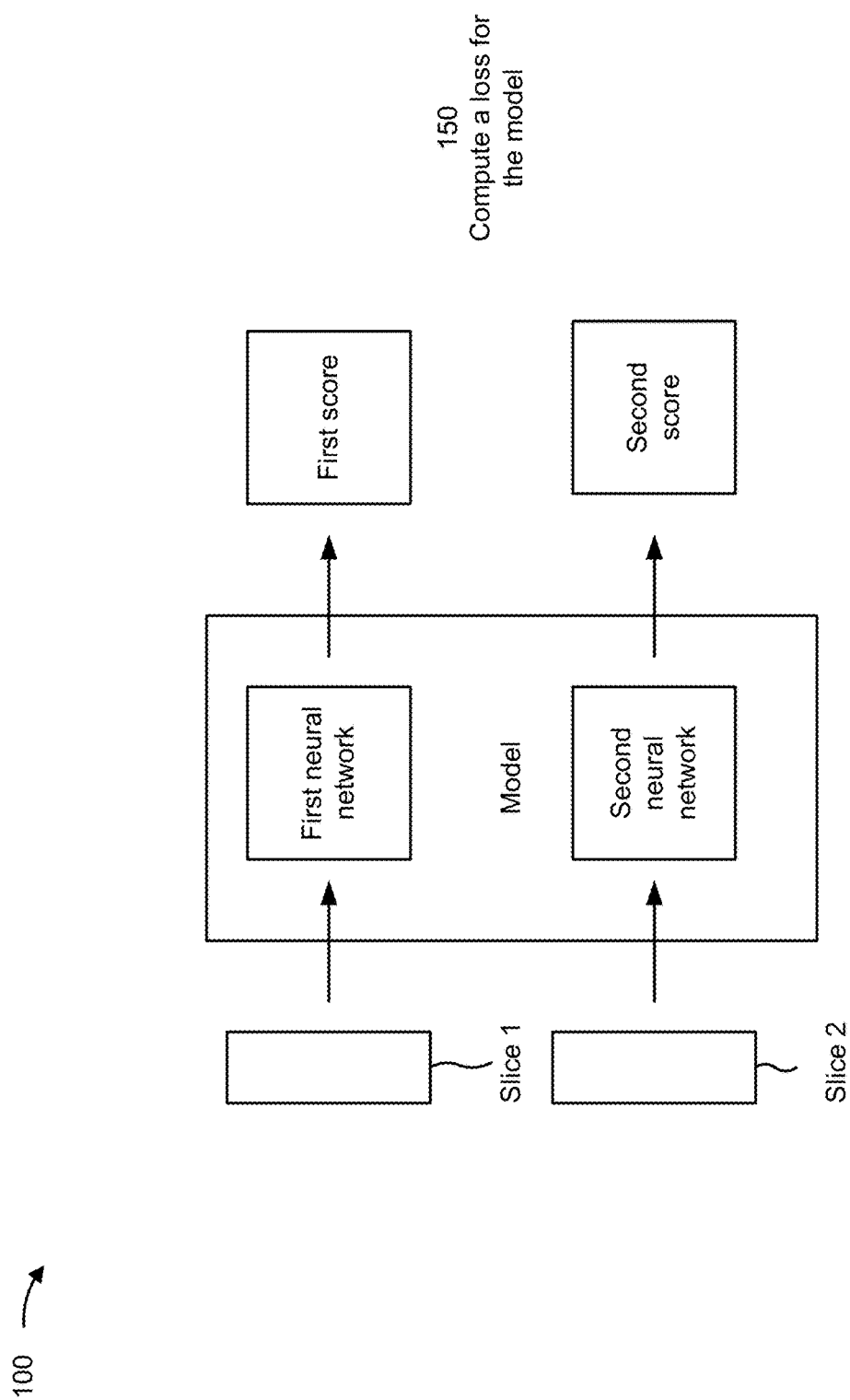

As shown in FIG. 1G, and by reference number 150, the prediction system 105 may compute a loss for the model based on the first score and the second score. The loss may indicate an accuracy associated with the first score and the second score. The prediction system 105 may modify one or more portions of the model (e.g., one or more weights of a neural network included in the model) to minimize the loss for the model (e.g., to increase an accuracy of the model).

In some implementations, the loss may include a monotonic loss. A monotonic loss is a loss that induces the predicted score to be monotonic and/or non-decreasing. The monotonic loss may be associated with the model determining that the probability of an occurrence of an event determined for portions of the region of interest increases, or remains constant, over time (e.g., from the start frame through the end frame). For example, the monotonic loss may be determined based on a maximum of a value of the first score minus the second score and the value 0.0 (e.g., monotonic loss=max((first score−second score); 0.0)).

In some implementations, the loss may include a start loss. The start loss may be associated with the model assigning a minimum score (e.g., a score of 0.0) to a video slice extracted from the beginning of the region of interest (e.g., the start frame, a video slice within a threshold quantity of frames of the start frame, and/or a video slice within a threshold amount of time from the start frame, among other examples).

In some implementations, the start loss may include a penalty function (described in greater detail below) that penalizes the model when the model does not assign the minimum score to a video slice extracted from the beginning of the region of interest. For example, the start loss may be computed based on the formula:

start loss=(first score)×((penalty function)(first ground truth)).

In some implementations, the loss may include an end loss. The end loss may be associated with the model assigning a maximum score (e.g., a score of 1.0, 10.0, or 100%, among other examples) to a video slice extracted from the end of the region of interest (e.g., the end frame, a video slice within a threshold quantity of frames of the end frame, and/or a video slice within a threshold amount of time from the end frame, among other examples). In some implementations, the end loss may include a penalty function that penalizes the model when the model does not assign the maximum score to a video slice extract from the end of the region of interest. For example, the end loss may be computed based on the formula:

end loss=(1−second score)×((penalty function)(second ground truth)).

In some implementations, the loss may include a near loss. The near loss may be associated with a similarity between the first score and the second score being consistent with a distance (e.g., a quantity of frames or an amount of time, among other examples) between the first video slice and the second video slice. For example, when the first video slice is positioned close to (e.g., within a threshold quantity of frames or a threshold amount of time, among other examples) the second video slice within the region of interest, the near loss may penalize the model when the first score is not about the same as the second score (e.g., when a difference between the first score and the second score satisfies (e.g., is greater than) a distance threshold). In some implementations, the near loss may be computed based on the formula:

near loss=c+abs(first score−second score)×((penalty function)(first score−second score)), where c is a constant value (e.g., 0.1).

In some implementations, the loss includes two or more of the monotonic loss, the start loss, the end loss, or the near loss. In some implementations, the loss may be a total loss that is determined based on a function of the monotonic loss, the start loss, the end loss, and the near loss. For example, the loss may be a total loss that is determined based on a sum of the monotonic loss, the start loss, the end loss, and the near loss or a product of the monotonic loss, the start loss, the end loss, and the near loss, among other examples.

The penalty function may comprise a constraint that is applied to an algorithm utilized by the model. For example, the penalty function may be utilized to determine a strength (e.g., a weight) of a penalty applied to the model to guide the model towards an accurate prediction. In some implementations, the penalty function may be used to weight the different losses according to the distances of the video slices to a beginning and/or an end of the region of interest. For example, the model may assume that the region interest begins depicting a safe condition (e.g., a video slice associated with a score of zero) and ends depicting an unsafe condition (e.g., a video slice associated with a score of one). Therefore, when a video slice is close (e.g., within a threshold distance) to the beginning of the region of interest, the penalty function may be configured to output a relatively high penalty when the predicted score does not indicate that the video slice depicts a safe condition. Similarly, when a video slice is close (e.g., within a threshold distance) to the end of the region of interest, the penalty function may be configured to output a relatively high penalty when the predicted score does not indicate that the video slice depicts an unsafe condition. Because the model cannot assume with at least a threshold level of certainty that a video slice located around a center portion of the region of interest depicts a safe or an unsafe condition, the penalty function may be configured to output no penalty or a relatively small penalty when the score predicted by the model is inaccurate.

The penalty function may be used as a component to calculate each one of the individual losses (e.g., the monotonic loss, the start loss, the end loss, and the near loss) that are aggregated to determine the loss, as described above. In some implementations, the penalty function may be used in the process of computing the loss function that is used by an automatic differentiation (e.g., autograd) framework (e.g., PyTorch™, TensorFlow™, and/or MXNet, among other examples). The loss function may be used by the automatic differentiation framework to update the model weights in a way so that the model is optimized to produce the desired outputs given a training input.

The penalty function may guide the model weight updates computed using backpropagation by the autograd framework (e.g., PyTorch™, TensorFlow™). In some implementations, the penalty function causes the model "understand" that a score of 0 (e.g., a lowest score) indicates a lowest level of risk of an occurrence of an event (e.g., a safe condition) and a score of 1 (e.g., a highest score) indicates a highest level of risk of an occurrence of an event (e.g., an unsafe condition). The penalty function may cause the model to modify the weights in a way that causes the model to predict a score of 0 for video slices located close to the beginning of the region of interest and a score of 1 for video slices located close to the end of the region of interest.

In some implementations, the penalty function may be configured to penalize the model when a distance between the start of the region of interest and the start of the first video slice (e.g., a distance between a first frame of the first video slice and the start frame) and/or a distance between the end of the second video slice and the end of the region of interest (e.g., a distance between a last frame of the second video slice and the end frame) is greater than a distance threshold. In some implementations, the penalty function may be defined as:

penalty function(z)=max(M×(1.0−z/k),0.0), where z the distance between the start of the region of interest and the start of the first video slice or the distance between the end of the second video slice and the end of the region of interest, M is a constant value that causes the start loss, the end loss, and/or the near loss to be between 0.0 through 1.0, and k is the distance threshold.

The distance threshold may correspond to a higher bound. The distance threshold may set a maximum distance above which the penalty function value is 0 and therefore the loss functions that use the penalty function are 0 (e.g., the start loss, the end loss, and/or the near loss). As an example, if the first slice is selected far (at a distance higher than the distance threshold k) from the beginning of the region of interest than the start loss value is 0. This may reflect that for slices located around the middle of the region of interest, it may not be clear what the score is, and the score may not be close to 0 (or close to 1) and therefore no start loss (or end loss) can be applied. Similarly, for slices that are separated by a distance greater than the distance threshold, the near loss value may be 0 based on the slices being far enough apart that it may not be required to impose the scores determined for the slices to be similar.

In some implementations, the prediction system 105 may modify one or more weights of the first neural network and the second neural network based on the loss. The first neural network and the second neural network may share a same set of weights and/or the first neural network may be the same as the second neural network. Therefore, the prediction system may perform the same modification to one or more weights of the first neural network as is performed for a corresponding one or more weights of the second neural network.

Alternatively, and/or additionally, the prediction system 105 may modify the one or more weights of the first neural network and the second neural network based on losses determined based on performing an iteration of training the model (described in greater detail below). Similarly, because the first neural network and the second neural network may share a same set of weights and/or the first neural network may be the same as the second neural network, the prediction system may perform, based on performing an iteration of training the model, the same modification to one or more weights of the first neural network as is performed for a corresponding one or more weights of the second neural network.

In some implementations, the prediction system 105 may determine a point in the region of interest where the portion of the video corresponding to the region of interest transitions from a safe condition to a dangerous condition. The determined point may correspond to a point at which a user viewing the video would understand that the event is going to occur.

In some implementations, the prediction system 105 may obtain a second video from the plurality of videos and a portion of the sensor data associated with the second video from the sensor data. The prediction system 105 may extract a portion of video corresponding to a region of interest from the second video based on a time associated with a maximum sensor value of the second sensor data. In some implementations, the prediction system 105 may extract the portion of video from the second video in a manner similar to that described above.

The prediction system 105 may slice the region of interest to generate a set of video slices (e.g., a first video slice and a second video slice) and may utilize the set of video slices to train the model. In some implementations, the prediction system 105 may slice the region of interest to generate a set of video slices and may utilize the set of video slices to train the model in a manner similar to that described above. In some implementations, the system may continue in a similar manner for each remaining video, of the plurality of videos, to complete a first iteration of training the model.

In some implementations, the prediction system 105 may perform a plurality of iterations to train the model. In some implementations, for each iteration, the prediction system 105 may generate different sets of video slices from each video of the plurality of videos (e.g., sets of video slices that are different from sets of video slices generated in previous iterations).

As an example, during the first iteration of training the model, the prediction system 105 may generate, for a first video, of the plurality of videos, a first video slice and a second video slice. During a second iteration of training the model, the prediction system 105 may generate, for the first video, a third video slice and a fourth video slice. The third video slice and/or the fourth video slice may be different from the first video slice and/or the second video slice.

In some implementations, the prediction system 105 may continue to perform iterations of training the model until an accuracy associated with the model determining a scores for a set of video slices satisfies one or more criteria (e.g., until the loss satisfies a loss threshold). In some implementations, the prediction system 105 may continue to perform iterations of training the model until a quantity (e.g., 100, 1000, or 5000, among other examples) of iterations of training the model are performed.

In some implementations, the prediction system 105 and/or the model (e.g., the first neural network and/or the second neural network) may be deployed to an environment based on performing the iterations of training the model. In some implementations, the environment may include a multi-access edge computing (MEC) environment. In a MEC environment, computing is enabled by a network architecture that provides computing capabilities to a connected device (e.g., a vehicle device (e.g., a dashcam, a GPS device, an accelerometer, a gyroscope, and/or an autonomous driving system) or a surveillance device (e.g., a video camera, a biometric sensor device, and/or another type of surveillance device)) via computing platforms at or near an edge of a network (e.g., a wireless communication network).

Accordingly, because a MEC environment may provide computing at or near the edge of the network, increased performance may be achieved over networks in which computing is performed topologically and/or physically further from a connected device. For example, the MEC environment may offer improved performance due to less traffic and/or congestion between the connected device and the computing node(s), less latency (due to closer proximity to the connected device), and/or increased flexibility (due to a greater amount of computing node(s)).

In some implementations, the environment may include an environment associated with the sensor device 110. For example, the environment may include a vehicular environment (e.g., the prediction system 105 and/or the model may be included in a vehicle and/or a vehicle device associated with the vehicle), a surveillance environment (e.g., the prediction system 105 and/or the model may be included in an environment associated with a surveillance device), or an industrial environment (e.g., the prediction system 105 and/or the model may be included in an environment associated with an industrial system (e.g., process control system that is configured to monitor a performance one or more other devices)).

As shown in FIG. 1H, and by reference number 155, the prediction system 105 may receive image data from the sensor device 110. For example, the prediction system 105 (e.g., the trained model) may deployed within a network and/or an environment. The prediction system 105 may receive image data from a sensor device 110 connected to the network and/or associated with the environment, either directly or via one or more other devices.

The prediction system 105 may provide the image data as an input to the model based on receiving the image data from the sensor device 110. As shown by reference number 160, the prediction system 105 may determine whether an event is likely to occur based on the model processing the image data. For example, the model may process the image data and may determine a score indicating a probability of an occurrence of the event. The prediction system 105 may determine whether the image data indicates that the event is likely to occur based on the score (e.g., whether the score satisfies one or more criteria (e.g., greater than a score threshold, less than a score threshold, or crosses a score threshold)).

In some implementations, the prediction system 105 may determine that the image data indicates that the event is likely to occur. The prediction system 105 may provide a warning and/or a notification indicating that the event is likely to occur (e.g., to a user device or a device associated with the sensor device 110 (e.g., a vehicle device or a surveillance device)). In this way, the prediction system 105 may provide the warning and/or the notification prior to the occurrence of the event thereby providing sufficient time for a user or a device (e.g., an autonomous driving system) to perform one or more actions to prevent the occurrence of the event.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

FIG. 2 is a diagram of an example environment 200 in which systems and/or methods described herein may be implemented. As shown in FIG. 2, environment 200 may include a prediction system 105, a sensor device 110, and a network 210. Devices of environment 200 may interconnect via wired connections, wireless connections, or a combination of wired and wireless connections.

The prediction system 105 includes one or more devices capable of receiving, generating, storing, processing, and/or providing information associated with training and utilizing event prediction models for camera-based warning systems, as described elsewhere herein. The prediction system 105 may include a communication device and/or a computing device. For example, the prediction system 105 may include a server, such as an application server, a client server, a web server, a database server, a host server, a proxy server, a virtual server (e.g., executing on computing hardware), or a server in a cloud computing system. In some implementations, the prediction system 105 may include computing hardware used in a cloud computing environment.

The sensor device 110 includes one or more devices capable of sensing one or more characteristics of a device and/or an environment surrounding a device. For example, the sensor device 110 may include one or more of a camera, a light detection and ranging (LIDAR) sensor, a radio detection and ranging (RADAR) sensor, a sonar sensor, and/or an inertial measurement unit, among other examples. Additionally, or alternatively, the sensor device 110 may include a magnetometer (e.g., a Hall effect sensor, an anisotropic magnetoresistive (AMR) sensor, and/or a giant magneto-resistive sensor (GMR)), a location sensor (e.g., a GPS receiver, a local positioning system (LPS) device (e.g., that uses triangulation and/or multi-lateration), a gyroscope (e.g., a micro-electro-mechanical systems (MEMS) gyroscope or a similar type of device), an accelerometer, a speed sensor, a motion sensor, an infrared sensor, and/or a temperature sensor, a pressure sensor, among other examples.

Accordingly, the sensor device 110 may include any suitable sensor or combination of sensors that may be configured within a sensor suite to perform one or more operations and/or to generate sensor data to permit one or more operations to be performed, as described herein. For example, the sensor device 110 may be configured within a sensor suite to capture image data of an environment associated with the sensor device 110, detect the presence of one or more objects in the environment, detect a proximity to one or more objects in the environment, determine a location of the sensor device 110 and/or a device associated with the sensor device 110, determine a speed associated with the sensor device 110 and/or a device associated with the sensor device 110, and/or determine a location and/or speed of one or more objects in the environment associated with the sensor device 110, among other examples. As described herein, sensor data generated by the sensor device 110 may be communicated (e.g., via a communication component 360 (shown in FIG. 3)) to another device (e.g., the prediction system 105) to permit the sensor data to be used by the other device to perform one or more operations associated with training a model to predict an occurrence of an event.

The network 210 includes one or more wired and/or wireless networks. For example, the network 210 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
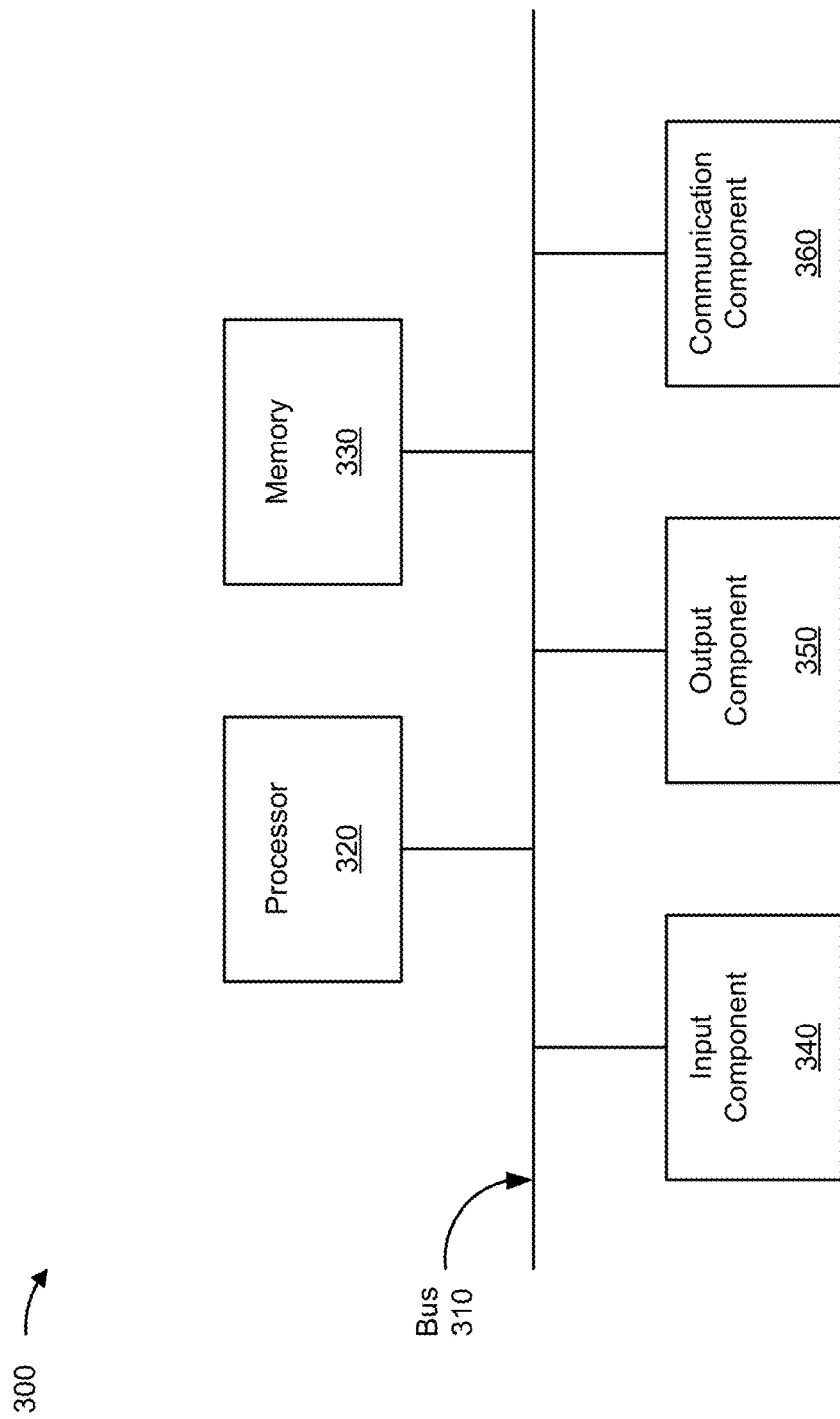
FIG. 3 is a diagram of example components of one or more devices of FIG. 2.

FIG. 3 is a diagram of example components of a device 300, which may correspond to the prediction system 105 and/or the sensor device 110. In some implementations, the prediction system 105 and/or the sensor device 110 may include one or more devices 300 and/or one or more components of device 300. As shown in FIG. 3, device 300 may include a bus 310, a processor 320, a memory 330, an input component 340, an output component 350, and a communication component 360.

The bus 310 includes one or more components that enable wired and/or wireless communication among the components of device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory).

The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of device 300. In some implementations, the memory 330 includes one or more memories that are coupled to one or more processors (e.g., the processor 320), such as via bus 310.

The input component 340 enables device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
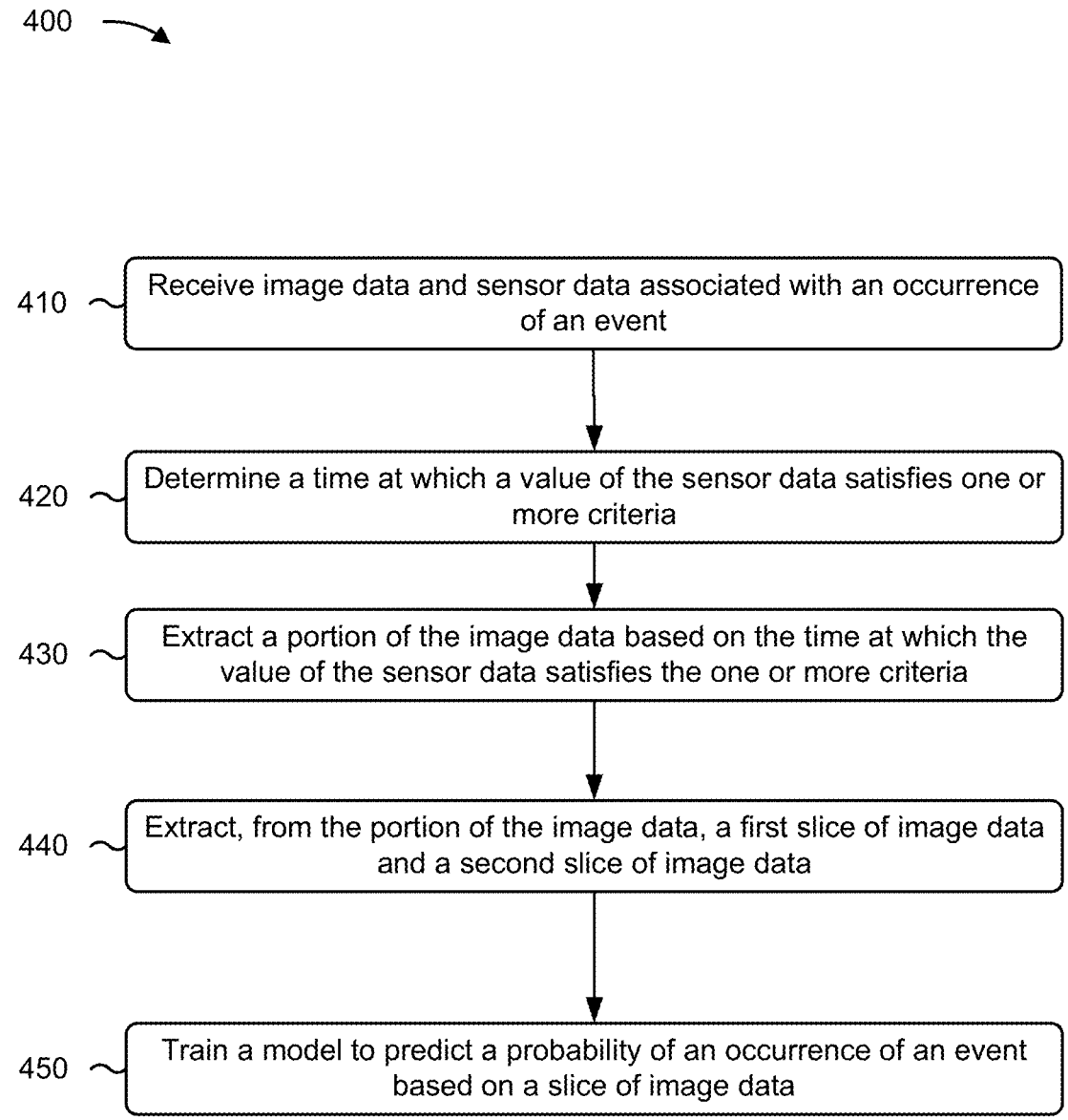
FIG. 4 is a flowchart of an example process relating to training and utilizing event prediction models for camera-based warning systems.

FIG. 4 is a flowchart of an example process 400 associated with systems and methods for training event prediction models for camera-based warning systems. In some implementations, one or more process blocks of FIG. 4 may be performed by a device (e.g., the prediction system 105). In some implementations, one or more process blocks of FIG. 4 may be performed by another device or a group of devices separate from or including the device, such as a sensor device (e.g., the sensor device 110). Additionally, or alternatively, one or more process blocks of FIG. 4 may be performed by one or more components of device 300, such as the processor 320, the memory 330, the input component 340, the output component 350, and/or the communication component 360.

As shown in FIG. 4, process 400 may include receiving image data and sensor data associated with an occurrence of an event (block 410). For example, the device may receive image data and sensor data associated with the image data. In some implementations, the image data may depict a series of scenes that are captured over a time period and that are associated with an occurrence of an event, as described above.

As further shown in FIG. 4, process 400 may include determining a time at which a value of the sensor data satisfies one or more criteria (block 420). For example, the device may determine a time, within the time period, at which a value of the sensor data satisfies one or more criteria, as described above.

In some implementations, the device may determine a sum of squares based on a portion of the sensor data. For example, the sensor data may include a series of sensor values. Each sensor value may include a plurality of component values. For each sensor value, the device may determine a sum of the squares of the plurality component values. The device may determine that the value of the sensor data satisfies the one or more criteria based on the sum of squares determined for each sensor value.

As further shown in FIG. 4, process 400 may include extracting a portion of the image data based on the time at which the value of the sensor data satisfies the one or more criteria (block 430). For example, the device may extract a portion of the image data from a start frame corresponding to a start of a video included in the image data through an end frame associated with the time at which the value of the sensor data satisfies the one or more criteria, as described above.

In some implementations, the image data includes a plurality of frames. The device may determine a frame, of the plurality of frames, associated with the time at which the value of the sensor data satisfies the one or more criteria. The device may extract a series of frames, of the plurality of frames, based on the determined frame. The series of frames may correspond to the portion of the image data and the determined frame may correspond to a last frame of the series of frames.

As further shown in FIG. 4, process 400 may include extracting, from the portion of the image data, a first slice of image data and a second slice of image data (block 440). For example, the device may extract, from the portion of the image data, a first slice of image data depicting a first set of scenes, of the series of scenes, and a second slice of image data depicting a second set of scenes, of the series of scenes, as described above.

As further shown in FIG. 4, process 400 may include training a model to predict a probability of an occurrence of an event (block 450). For example, the device may train, based on the first slice of image data and the second slice of image data, a model to predict a probability of an occurrence of an event based on image data provided as an input to the trained model, as described above.

In some implementations, the model includes a neural network (e.g., a Siamese neural network) having a first neural network and a second neural network. The device may provide the first slice of image data to the first neural network and may provide the second slice of image data to the second neural network.

In some implementations, the first set of scenes occur during the time period prior to the second set of scenes. The model (e.g., the first neural network of the neural network) may process the first slice of image data to determine a first score associated with the first slice of image data. The first score may indicate a first probability of the occurrence of the event. The model (e.g., the second neural network of the neural network) may process the second slice of image data to determine a second score associated with the second slice of image data. The second score may indicate a second probability of the occurrence of the event. In some implementations, the device may determine a loss associated with the model based on whether the first score is greater than the second score.

In some implementations, the loss may include one or more of a monotonic loss, a start loss associated with a minimum score being assigned to a beginning of the first slice of image data and a beginning of the second slice of image data, an end loss associated with a maximum score being assigned to an end of the first slice of image data and an end of the second slice of image data, or a near loss associated with a similarity between the first score and the second score based on a distance between the end of the first slice of image data and the beginning of the second slice of image data.

In some implementations, the device may determine the loss based on one or more of the loss based on a sum of the monotonic loss, the start loss, the end loss, and the near loss. For example, the device may determine the loss based on a sum of the monotonic loss, the start loss, the end loss, and the near loss.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, image data and sensor data associated with the image data, wherein the image data depicts a series of scenes that are captured over a time period and that are associated with an occurrence of an event;
   determining, by the device, a time of interest, within the time period, at which a value of the sensor data satisfies one or more criteria;
   extracting, by the device, a portion of the image data based on the time of interest;
   extracting, by the device and from the portion of the image data, a first slice of image data depicting a first set of scenes, of the series of scenes, and a second slice of image data depicting a second set of scenes, of the series of scenes, wherein a start of the first slice of image data is after a beginning of the portion of interest, wherein an end of the second slice of image data is before an end of the portion of interest, wherein the time of interest is at least partially between an end of the first slice of image data and a beginning of the second slice of image data; and
   training, by the device and based on the first slice of image data and the second slice of image data, a model to predict a probability of an occurrence of an event and to determine whether the probability satisfies a probability threshold.

2. The method of claim 1, wherein the image data includes a plurality of frames, and wherein extracting the portion of the image data comprises:
- determining a frame, of the plurality of frames, associated with the time of interest; and
- extracting a series of frames, of the plurality of frames, based on the frame, wherein the series of frames corresponds to the portion of the image data, and wherein the frame is a last frame of the series of frames.

3. The method of claim 1, wherein the model includes a neural network, and wherein training the model comprises:
- providing the first slice of image data to a first neural network, of the neural network; and
- providing the second slice of image data to a second neural network, of the neural network.

4. The method of claim 1, further comprising:
- determining a sum of squares based on a portion of the sensor data associated with the time of interest;
- determining that the value of the sensor data satisfies the one or more criteria based on the sum of squares; and
- determining the time of interest based on the value of the sensor data satisfying the one or more criteria.

5. The method of claim 1, wherein the first set of scenes occur during the time period prior to the second set of scenes, and wherein training the model comprises:
- determining a first score associated with the first slice of image data, wherein the first score indicates a first probability of the occurrence of the event;
- determining a second score associated with the second slice of image data, wherein the second score indicates a second probability of the occurrence of the event; and
- determining a loss associated with the model based on whether the first score is greater than the second score.

6. The method of claim 5, wherein determining the loss comprises one or more of:
- determining a monotonic loss;
- determining a start loss associated with a minimum score being assigned to a beginning of the first slice of image data and a beginning of the second slice of image data;
- determining an end loss associated with a maximum score being assigned to an end of the first slice of image data and an end of the second slice of image data; or
- determining a near loss associated with a similarity between the first score and the second score based on a distance between the end of the first slice of image data and the beginning of the second slice of image data.

7. The method of claim 5, wherein determining the loss comprises:
- determining the loss based on a sum of a monotonic loss, a start loss associated with a minimum score being assigned to a beginning of the first slice of image data and a beginning of the second slice of image data, an end loss associated with a maximum score being assigned to an end of the first slice of image data and an end of the second slice of image data, and a near loss associated with a similarity between the first score and the second score based on a distance between the end of the first slice of image data and the beginning of the second slice of image data.

8. A device, comprising:
one or more processors configured to:
- receive image data and sensor data associated with the image data, wherein the image data depicts a series of scenes that are captured over a time period and that are associated with an occurrence of an event;
- determine a time of interest, within the time period, at which a value of the sensor data satisfies one or more criteria;
- extract a portion of the image data based on the time of interest;
- extract, from the portion of the image data, a first slice of image data depicting a first set of scenes, of the series of scenes, and a second slice of image data depicting a second set of scenes, of the series of scenes, wherein a start of the first slice of image data is after a beginning of the portion of interest, wherein an end of the second slice of image data is before an end of the portion of interest, wherein the time of interest is at least partially between an end of the first slice of image data and a beginning of the second slice of image data; and
- train, based on the first slice of image data and the second slice of image data, a model to predict a probability of an occurrence of an event and to determine whether the probability satisfies a probability threshold.

9. The device of claim 8, wherein the image data includes a plurality of frames, and wherein the one or more processors, to extract the portion of the image data, are configured to:
- determine a frame, of the plurality of frames, associated with the time of interest; and
- extract a series of frames, of the plurality of frames, based on the frame, wherein the series of frames corresponds to the portion of the image data, and wherein the frame is a last frame of the series of frames.

10. The device of claim 8, wherein the model includes a neural network, and wherein the one or more processors, to train the model, are configured to:
- provide the first slice of image data to a first neural network, of the neural network; and
- provide the second slice of image data to a second neural network, of the neural network.

11. The device of claim 8, wherein the one or more processors are further configured to:
- determine a sum of squares based on a portion of the sensor data associated with the time of interest;
- determine that the value of the sensor data satisfies the one or more criteria based on the sum of squares; and
- determine the time of interest based on the value of the sensor data satisfying the one or more criteria.

12. The device of claim 8, wherein the first set of scenes occur during the time period prior to the second set of scenes, and wherein the one or more processors, to train the model, are configured to:
- determine a first score associated with the first slice of image data, wherein the first score indicates a first probability of the occurrence of the event;
- determine a second score associated with the second slice of image data, wherein the second score indicates a second probability of the occurrence of the event; and
- determine a loss associated with the model based on whether the first score is greater than the second score.

13. The device of claim 12, wherein the one or more processors, to determine the loss, are configured to one or more of:
- determine a monotonic loss;
- determine a start loss associated with a minimum score being assigned to a beginning of the first slice of image data and a beginning of the second slice of image data;

determine an end loss associated with a maximum score being assigned to an end of the first slice of image data and an end of the second slice of image data; or determine a near loss associated with a similarity between the first score and the second score based on a distance between the end of the first slice of image data and the beginning of the second slice of image data.

14. The device of claim 12, wherein the one or more processors, to determine the loss, are configured to:

determine the loss based on a sum of a monotonic loss, a start loss associated with a minimum score being assigned to a beginning of the first slice of image data and a beginning of the second slice of image data, an end loss associated with a maximum score being assigned to an end of the first slice of image data and an end of the second slice of image data, and a near loss associated with a similarity between the first score and the second score based on a distance between the end of the first slice of image data and the beginning of the second slice of image data.

15. A non-transitory computer-readable medium storing a set of instructions, the set of instructions comprising:

one or more instructions that, when executed by one or more processors of a device, cause the device to:

receive image data and sensor data associated with the image data, wherein the image data depicts a series of scenes that are captured over a time period and that are associated with an occurrence of an event;

determine a time of interest, within the time period, at which a value of the sensor data satisfies one or more criteria;

extract a portion of the image data based on the time of interest;

extract, from the portion of the image data, a first slice of image data depicting a first set of scenes, of the series of scenes, and a second slice of image data depicting a second set of scenes, of the series of scenes, wherein a start of the first slice of image data is after a beginning of the portion of interest, wherein an end of the second slice of image data is before an end of the portion of interest, wherein the time of interest is at least partially between an end of the first slice of image data and a beginning of the second slice of image data; and train, based on the first slice of image data and the second slice of image data, a model to predict a probability of an occurrence of an event and to determine whether the probability satisfies a probability threshold.

16. The non-transitory computer-readable medium of claim 15, wherein the image data includes a plurality of frames, and wherein the one or more instructions, that when executed by the one or more processors, cause the device to extract the portion of the image data, cause the device to:

determine a frame, of the plurality of frames, associated with the time of interest; and extract a series of frames, of the plurality of frames, based on the frame, wherein the series of frames corresponds to the portion of the image data, and wherein the frame is a last frame of the series of frames.

17. The non-transitory computer-readable medium of claim 15, wherein the model includes a neural network, and wherein the one or more instructions, that when executed by the one or more processors, cause the device to train the model, cause the device to:

provide the first slice of image data to a first neural network, of the neural network; and provide the second slice of image data to a second neural network, of the neural network.

18. The non-transitory computer-readable medium of claim 15, wherein the one or more instructions further cause the device to:

determine a sum of squares based on a portion of the sensor data associated with the time of interest;

determine that the value of the sensor data satisfies the one or more criteria based on the sum of squares; and determine the time of interest based on the value of the sensor data satisfying the one or more criteria.

19. The non-transitory computer-readable medium of claim 15, wherein the first set of scenes occur during the time period prior to the second set of scenes, and wherein the one or more instructions, that when executed by the one or more processors, cause the device to train the model, cause the device to:

determine a first score associated with the first slice of image data, wherein the first score indicates a first probability of the occurrence of the event;

determine a second score associated with the second slice of image data, wherein the second score indicates a second probability of the occurrence of the event; and determine a loss associated with the model based on whether the first score is greater than the second score.

20. The non-transitory computer-readable medium of claim 19, wherein the one or more instructions, that cause the device to determine the loss, cause the device to:

determine a monotonic loss;

determine a start loss associated with a minimum score being assigned to a beginning of the first slice of image data and a beginning of the second slice of image data;

determine an end loss associated with a maximum score being assigned to an end of the first slice of image data and an end of the second slice of image data;

determine a near loss associated with a similarity between the first score and the second score based on a distance between the end of the first slice of image data and the beginning of the second slice of image data; and determine the loss based on a sum of the monotonic loss, the start loss, the end loss, and the near loss.

* * * * *